June 1, 1954
S. A. SCHERBATSKOY
2,680,201
NEUTRON WELL LOGGING
Filed June 5, 1950
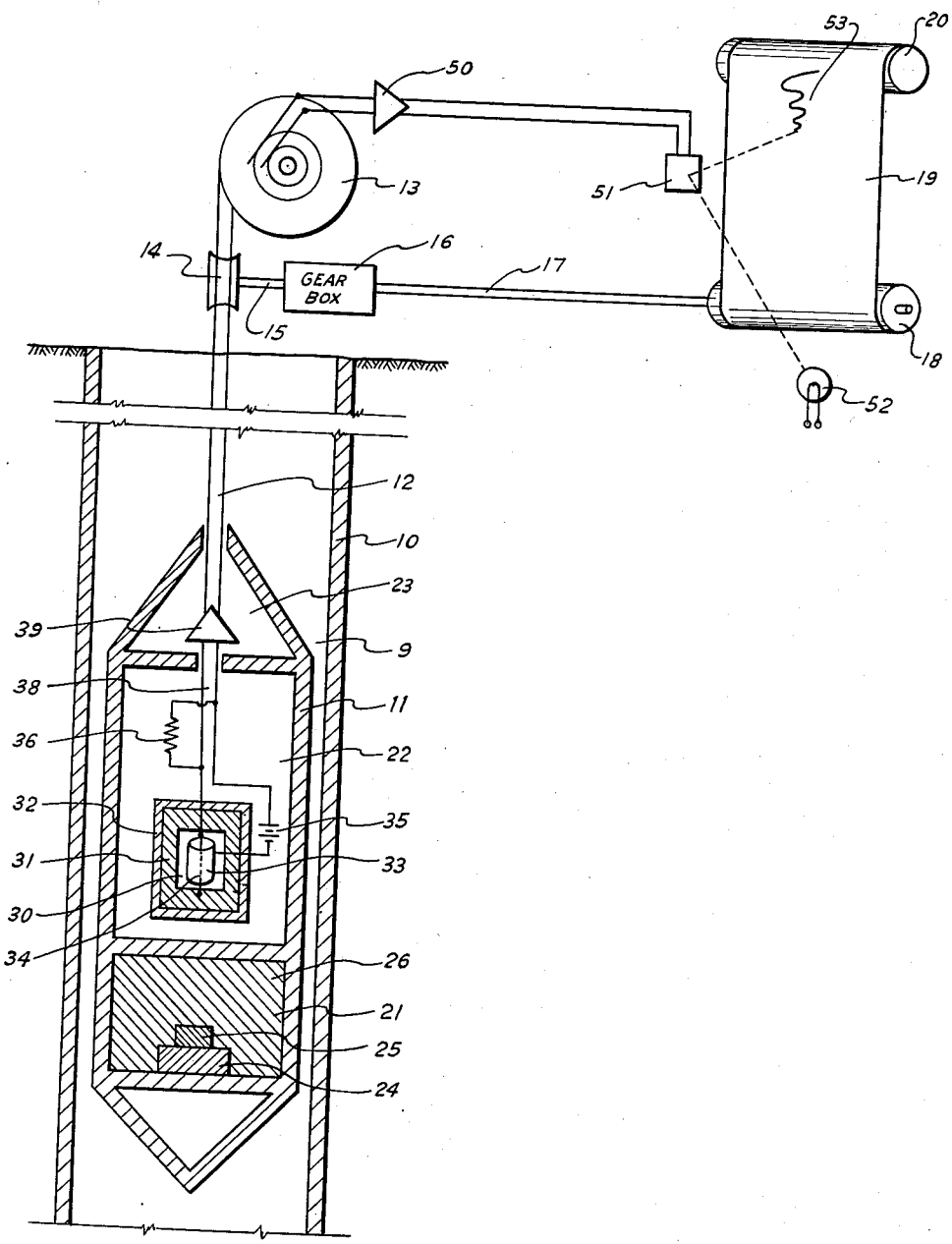
INVENTOR.
Serge A Scherbatskoy Patented June 1, 1954

2,680,201

UNITED STATES PATENT OFFICE 2,680,201

NEUTRON WELL LOGGING

Serge A. Scherbatskoy, Tulsa, Okla.

Application June 5, 1950, Serial No. 166,108

2 Claims. (Cl. 250—83.6)

This invention is concerned with a method and apparatus for performing in a bore hole measurements of radiation resulting from nuclear transformations within the formations adjoining said bore hole, said nuclear transformations being caused by an external agent such as a source of neutrons placed adjacent to said formations in the neighborhood of a detecting instrument.

These measurements commonly designated a "neutron well logging" can be broadly classified into two types. In the measurements of the first type a detector of gamma radiations accompanied with a source of neutrons is lowered into a bore hole in the earth and measurements are made at various depths of gamma radiations resulting from interaction of neutrons derived from said source with the adjoining formations. These measurements when correlated with depth provided a log commonly designated as neutron-gamma ray log. In the measurement of the second type a detector of slow neutrons accompanied with a source of neutrons lowered into a bore hole and the measurements obtained when correlated with depth provided a log commonly designated as neutron-slow neutron log.

The present invention has an object to provide a new method of well logging utilizing a source of fast neutrons for irradiating the formations and measuring the epithermal and fast neutrons returning from the formations. These epithermal and fast neutrons result from the interaction of the primary neutrons derived from the source with various elements of the formation.

It is apparent that a stream of fast neutrons emitted by a source and having energies between 1 m. e. v. and 10 m. e. v. penetrates into the adjoining formations and undergoes numerous collisions. As a result of such collisions the incoming neutrons gradually lose their energy owing to which the energy of the neutrons is considerably reduced. The energy spectrum of the neutron stream is therefore considerably reduced and occupies a wide band extending from the initial high energies of the order of several m. e. v. down to a fraction of e. v. which represents the lower energy limit and corresponds to the heat motion of the molecules in the earth formation. These low energy neutrons that are in thermal equilibrium with the adjoining formations are designated as thermal neutrons and have energy of about ¼ e. v. Because of their low velocity these neutrons are very easily detected by various means such as, for instance, described in the U. S. Patent 2,220,509 issued to Brons. A considerable fraction of diffused neutrons is comprised, however, within the energies that are considered above the thermal value and are located within the epithermal and fast neutron range. The epithermal range extends from 1 e. v. to about 10,000 e. v. and the fast neutron range extends above 10,000 e. v.

It is the purpose of the present invention to provide a well logging system that is based on measurements of diffused neutrons having energies in the epithermal range.

For further details of specific devices embodying the principles of this invention and for a more complete understanding of the mode of application of the principles of this invention and the numerous advantages thereof, reference may be had to the accompanying drawing which illustrates diagrammatically a bore hole which penetrates the strata of the earth and the general arrangement for logging the bore hole in accordance with the principles of the present invention.

Referring now to the drawing, there is schematically illustrated a drill hole 9 penetrating the formations to be explored. The drill hole is defined in the conventional manner by a tubular metallic casing designated by 10. For the purpose of exploring the formations along the bore hole there is provided in accordance with the present invention exploratory apparatus comprising a housing 11 which is lowered into the bore hole 9 by means of a cable 12 including as a part thereof suitable insulated conductors. The cable 12 has a length somewhat in excess of the depth of the bore hole to be explored and is normally wound on a drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to the take up spool 18.

The housing 11 of the exploratory apparatus is divided into three sections designated by numerals 21, 22, and 23, respectively. In the section 21 there is provided a solid support 24 on which is disposed a suitable source of neutrons generally designated as 25, such, for example, as radium beryllium preparation, which may be enclosed in a container made of a suitable material, such as glass. Instead of radium beryllium preparation, the source of neutrons may comprise, for example, a discharge tube adapted to bombard a beryllium or lithium composition with deuterons, thus causing a generation of neutrons in a manner understood by those skilled in the art. This neutron source 25 is enclosed with a jacket 26 made of a material such as lead, which allows the neutron rays to pass completely or for the greater part, therethrough.

The section 22 comprises a detector of slow neutrons within a suitable enclosure 30. The enclosure 30 is completely surrounded by blocks of paraffine 31 or any other suitable hydrogenous substance, and said paraffine is in turn covered by a layer of boron 32. The detector itself comprises borontrifluoride in a suitable container and two electrodes 33, 34 within said container, i. e. a cylindrical outer electrode 33 and a central wire electrode 34. A suitable battery 35 has one of its terminals connected to the electrode 33 to apply voltage to the counter and a resistor 36 is inserted between the other terminal of the battery 35 and the wire electrode 34. The terminals of the resistor are respectively connected through leads 38 to an amplifier 39 contained in the partition 23.

The performance of the instrument is based essentially upon the collisions between the neutrons derived from the source 25 and the target nuclei of various elements contained in the formations adjoining the drill hole. As a result of these collisions three types of radiations are produced at the points of interaction between the neutrons and target nuclei, i. e. gamma rays, fast neutrons and slow neutrons. The gamma rays are emitted by nuclei that become excited either by a collision or by a capture of a neutron and subsequently return to a lower energy state. The fast and slow neutrons result from the collisions between the neutrons derived from the source 25 and the target nuclei of the formations. At each collision a neutron loses a portion of its energy, and therefore if the collision cross section of the target nuclei is large, the collisions are numerous and the energy of the impinging neutrons is progressively degraded until it reaches its "thermal value" of 0.025 e. v. Consequently, slow neutrons are produced. On the other hand, if the collision cross section of the target nuclei in the formations is small, the collision is less frequent and consequently the neutrons do not lose their energy very noticeably. Consequently, we obtain fast neutrons.

It is thus apparent that the detector 30 is exposed to a heterogeneous stream of radiation derived from the formation and consisting essentially of a mixture of gamma rays, slow neutrons, and fast neutrons. This radiation comprises also epithermal neutrons having energies larger than thermal neutrons and smaller than fast neutrons. As stated above, it is usually agreed to designate as "fast" the neutrons having energies above 10,000 e. v. and as "epithermal" the neutrons having energies between 0.025 e. v. and 10,000 e. v.

The slow neutrons that arrive at the detector from the adjoining formations are absorbed by the boron in the layer 32, said boron emitting upon each absorption an alpha ray that is in turn absorbed in the layer and does not penetrate into the detector.

Consequently, the layer of boron absorbs all the thermal neutrons, and acts therefore as a shield that prevents the detection of slow neutrons.

The fast and epithermal neutrons arriving from the formation penetrate easily the boron layer 32 and interact with hydrogen atom contained in the layer 31. As a result of such an interaction the neutrons lose their energy until they reach the thermal value, and subsequently they diffuse into the detector as thermal neutrons and actuate the detector.

The gamma rays arriving from the formation traverse the boron and paraffine layers. However, they arrive in relatively small quantities to the detector 30 and have relatively small influence on the output of the detector.

It is thus apparent that the detector 30 is not responsive to thermal neutrons. It is responsive to neutrons having energies above the thermal level. In particular, it is responsive only to the epithermal neutrons that originally had a relatively high energy, but which had been slowed down by nuclear collision when traversing the paraffine layer 31.

It is also apparent that the effectiveness of the paraffine shield in slowing down the incoming fast neutrons depends upon its thickness. That is, a paraffine shield of large thickness is capable of slowing down fast neutrons from relatively high energies to low energies. On the other hand, in a thin paraffine layer the number of collisions is not very large. Consequently, only fast neutrons of relatively small energies (epithermal neutrons) are slowed down to thermal value and the incoming fast neutrons of high energy are relatively little effected by the paraffine. They pass through the paraffine layer and the ionization chamber without being detected.

Consequently, the detector 30 is responsive only to fast neutrons of limited energy band, said energy band comprising all the energies that are above the thermal value and which at the same time are below a determined value $E_{max}$, said value of $E_{max}$ being larger for larger thickness of the paraffine shield.

The output of the detector amplified by the amplifier 39 is transmitted through insulated conductors associated with the cable 12. It is subsequently amplified in a second amplifier 50 located above the opening to the bore hole and applied to a galvanometer coil 51. The galvanometer coil has attached thereto a suitable mirror in a manner well known to those skilled in the art and is adapted to reflect a beam of light derived from a source 52, thereby effectively producing on the sensitive film 19 a record comprising a trace 53 and representing the variation of the voltage applied to the galvanometer 51.

I claim:

1. A system for determining the character of formations traversed by a bore hole, comprising a source of neutrons, a detector of thermal neutrons, a hydrogenous substance surrounding said detector, a layer of substance that absorbs thermal neutrons, said layer surrounding said hydrogenous substance, means for lowering the aforesaid elements into said hole, whereby the formations adjacent to said hole are irradiated with neutrons from said source and emit neutrons towards said detector and whereby a portion of said emitted neutrons having energy above the thermal value gradually lose their energy by traversing said hydrogenous substance until they reach thermal value and enter said detector, the width of the energy range of neutrons within said portion depending upon the thickness of said hydrogenous substance, said detector being responsive to neutrons within said portion and producing a current representing the intensity of neutrons within said portion, means for determining the depth to which said elements are lowered, and means for recording said current in correlation with said depth.

2. A system for determining the character of formations traversed by a bore hole, comprising a source of neutrons, a detector of thermal neutrons, a hydrogenous layer surrounding said detector, a layer of boron surrounding said layer, means for lowering the aforesaid elements into said hole, whereby the formations adjacent to said hole are irradiated with neutrons from said source and emit neutrons towards said detector, and whereby a portion of said emitted neutrons having energy above the thermal value gradually lose their energy by traversing said layer until they reach thermal value and enter said detector, the width of the energy range of neutrons within said portion depending upon the thickness of said hydrogenous layer, said detector being responsive to neutrons within said portion and producing a current representing the intensity of neutrons within said portion, means for determining the depth to which said elements are lowered, and means for recording said current in correlation with said depth.

References Cited in the file of this patent

UNITED STATES PATENTS

| Number | Name | Date |
| --- | --- | --- |
| 2,206,634 | Fermi et al. | July 2, 1940 |
| 2,220,509 | Brons | Nov. 5, 1940 |
| 2,491,220 | Segre et al. | Dec. 13, 1949 |
| 2,508,772 | Pontecorvo | May 23, 1950 |